Jan. 13, 1959

C. J. SMITH

2,868,236

APPARATUS FOR MAKING WIRE ARTICLES

Filed Nov. 2, 1953

INVENTOR.
Clarence J. Smith
BY
Olson & Trexler
Attys.

INVENTOR.
Clarence J. Smith
BY
Olson & Trexler
attys.

United States Patent Office 2,868,236
Patented Jan. 13, 1959

2,868,236

APPARATUS FOR MAKING WIRE ARTICLES

Clarence J. Smith, Rockford, Ill., assignor, by mesne assignments, to W. F. and John Barnes Company, Rockford, Ill., a corporation of Illinois Application November 2, 1953, Serial No. 389,809

7 Claims. (Cl. 140—71)

The present invention relates to a novel apparatus for making wire articles, and more particularly to a novel apparatus for undulating and bending a continuous length of wire to provide various articles.

It has heretofore been proposed to provide various wire articles wherein the wire is undulated or formed into a zigzag shape. For example, a wire insert for automobile tire treads has been proposed wherein a wire is formed into a zigzag shape, and subsequently the transverse sections of the zigzag-shaped wire are formed into generally U-shapes. Another example is that of a spring utilizing a length of zigzag wire and generally referred to as a non-sag spring. However, the methods and apparatus heretofore known for making such articles have often been complicated and cumbersome in operation, and, therefore, uneconomical. Other methods and apparatus have not been particularly effective for forming tempered or spring wire as distinguished from soft wire, and in most cases, it is desirable to form the wire after it has been tempered since any subsequent heat treating of the wire often causes severe warping. In addition, some methods and apparatus heretofore known have been incapable of forming a wire into relatively sharp and deep undulations or zigzags without severely stretching and weakening the wire.

An object of the present invention is to provide a novel apparatus for making undulated or zigzag wire articles rapidly and economically.

Another object of the present invention is to provide a novel apparatus utilizing a plurality of steps for forming undulated or zigzag wire articles by which method and apparatus the wire articles may be formed continuously and economically.

A further object of the present invention is to provide a novel and relatively simple apparatus for forming sharply and deeply undulated wire articles rapidly and efficiently.

Still another object of the present invention is to provide a novel apparatus for forming undulated or zigzag wire articles without unduly stretching and weakening the wire.

A further object of the present invention is to provide a novel apparatus which is particularly adapted for making wire articles of the above described type from tempered or spring wire stock.

A more specific object of the present invention is to provide a novel apparatus for rapidly and efficiently forming relatively deep undulations in a wire.

Still another object of the present invention is to provide a novel and simple apparatus for rapidly and efficiently increasing the sharpness of undulations or zigzags in the previously undulated wire.

An additional object of the present invention is to provide a novel apparatus for forming transverse sections of a previously undulated wire generally into U-shapes efficiently and economically.

Other objects and advantages of the present invention will become apparent from the following description and the accompanying drawings, wherein:

Fig. 20 is a cross sectional view similar to Fig. 19, but showing the upper and lower dies moved together;

Fig. 21 is a perspective view of a length of zigzag wire and showing two steps for forming the wire into a tire insert or the like;

Fig. 24 is a cross sectional view taken along line 24—24 in Fig. 25 and showing a modified form of the apparatus for bending a zigzag wire to provide a tire insert or the like;

Figure 1:
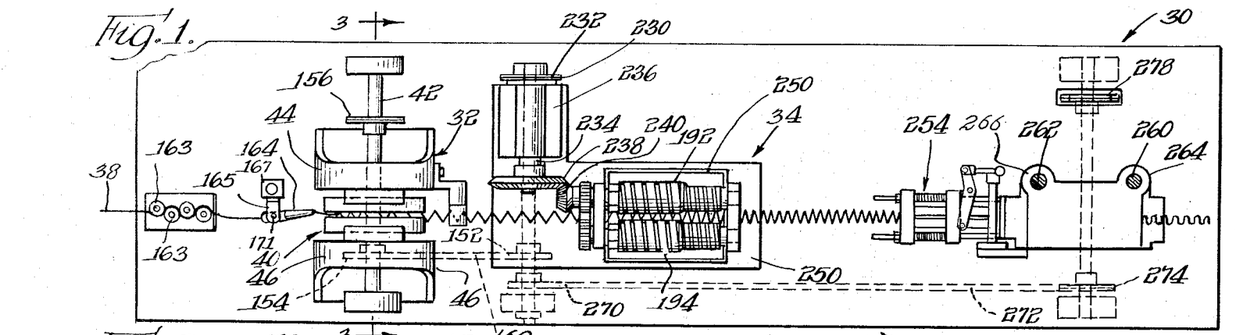
Fig. 1 is a somewhat diagrammatic plan view illustrating an apparatus embodying the features of this invention.
Figure 2:
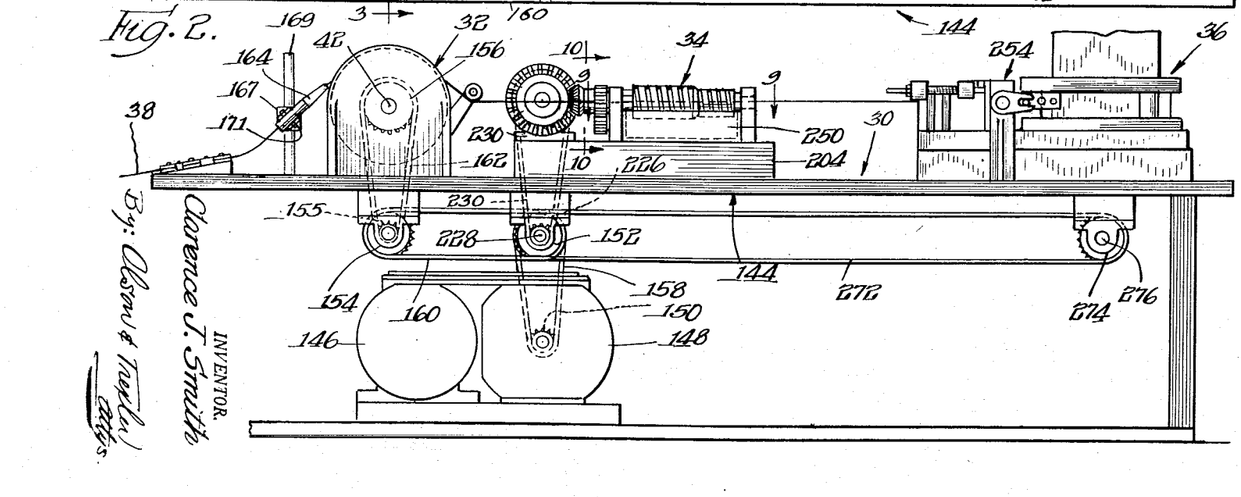
Fig. 2 is a somewhat diagrammatic side elevational view of the apparatus shown in Fig. 1.
Figure 3:
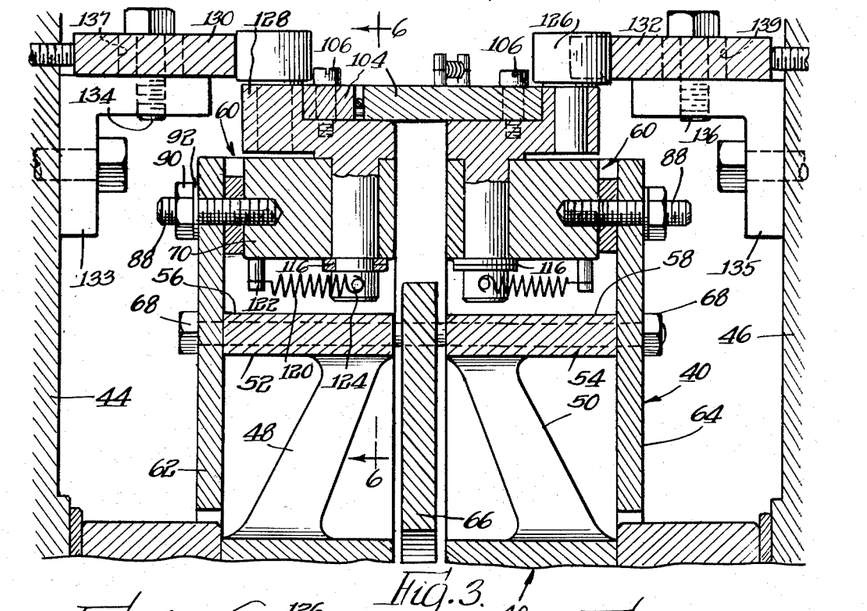
Fig. 3 is an enlarged fragmentary cross sectional view taken along line 3—3 in Fig. 1.

Referring now more specifically to the drawings, wherein like parts are designated by the same numerals throughout the various figures, an apparatus 30 embodying the principles of this invention is somewhat diagrammatically illustrated in Figs. 1 and 2 from which certain details have been omitted in order to show the novel features more clearly. In general, the apparatus 30 includes a mechanism 32 for initially forming straight wire stock into undulations or zigzags, a compressing mechanism 34 for compressing or increasing the sharpness of the previously formed undulations or zigzags in the wire, and stamping means 36 for forming the undulated wire in the manner described fully hereinbelow to provide, for example, an automobile tire tread insert. As will become apparent, these various wire forming means are constructed and correlated in operation so that the wire 38 may be fed continuously into the machine from a reel or the like, not shown, at the left end of the machine, as viewed in Fig. 2, and the finished wire may be continuously discharged from the right end of the machine and wound on a second reel, not shown. Thus, the process is continuous and may be conducted at relatively high speeds, whereby the finished wire article may be rapidly and economically manufactured.

Referring particularly to Figs. 1 through 7, it is seen that the bending mechanism 32 includes a wheel structure 40 fixed by keys or other suitable means, not shown, on a shaft 42 rotatably journaled in upstanding brackets 44 and 46. The wheel structure 40 includes a pair of spoked disks 48 and 50 having outer annular bodies 52 and 54, respectively. As shown best in Figs. 3 and 6, the bodies are provided with angularly spaced recesses 56 and 58 adapted to receive and support rows of wire bending devices generally indicated by the numeral 60 in the manner described below with each bending device in one row being disposed in opposing and cooperating relationship with a bending device in the other row. End plates 62 and 64 are secured to opposite sides of the wheel structure for closing one end or side of the recesses 56 and 58, and a center plate 66 is disposed between the wheel disks 48 and 50 and closes the opposite side of each of the recesses 56 and 58. It is understood, of course, that the wheel disks 48 and 50 and the plates 62, 64, and 66 are fixed together so as to prevent relative rotation therebetween by any suitable means, such as bolts 68.

Figure 4:
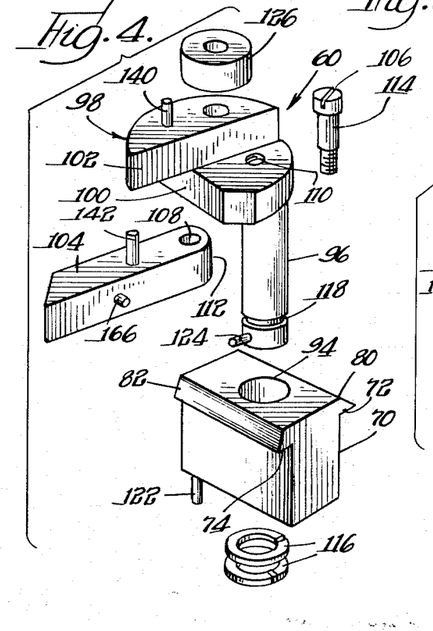
Fig. 4 is an exploded perspective view showing a portion of wire bending means embodying the features of this invention.
Figure 6:
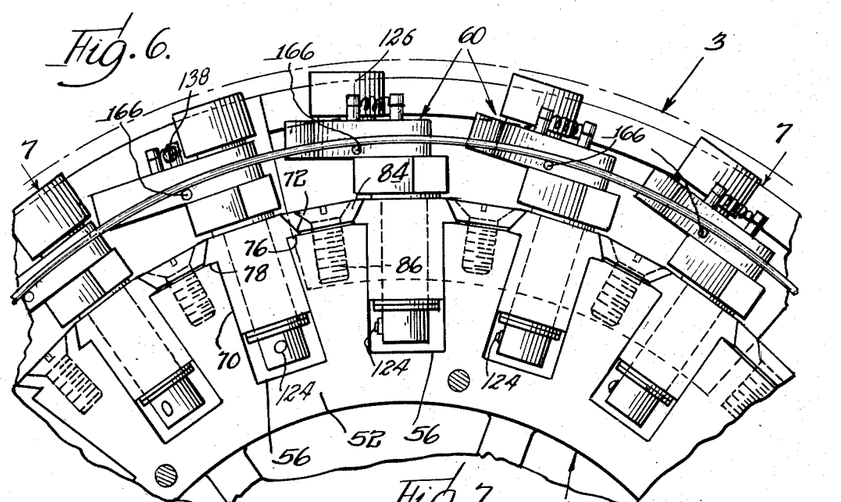
Fig. 6 is a fragmentary cross sectional view taken along line 6—6 in Fig. 3.

As shown best in Figs. 4 and 6, each of the bending devices 60 includes a mounting block 70 adapted to fit within the recesses in the wheel disks. The block 70 is provided with shoulders 72 and 74 cooperable with shoulders 76 and 78 in its associated recess for limiting radial movement of the mounting block into the recess. Each block is provided with outwardly facing inclined surfaces 80 and 82 which are adapted to cooperate with a clamping plate 84 having inclined surfaces and fixed to the wheel disk by a screw 86 for clamping the mounting block into place. Each block is also fixed within its associated recess by means of a set screw 88 extended through the end plate and locked by means of a nut 90 and lock washer 92. With this structure, it is seen that opposing mounting blocks 70 may be relatively assembled in their respective recesses 56 and 58 and may be adjusted toward and away from each other by adjusting the set screws 88. This, of course, enables adjustment of opposing bending devices toward and away from each other to adapt the apparatus for forming zigzag wire with transverse portions of various lengths.

Each mounting block 70 is provided with a bore 94 adapted to receive a shaft 96 of a pivot member 98. The pivot member includes a lever portion 100 and an abutment portion 102. If desired, shaft 96, lever portion 100, and abutment portion 102 may be made integral in the manner illustrated, or they may be made separate and welded or otherwise rigidly secured together. A wire bending finger element 104 preferably made from hardened steel is adapted to be pivotally mounted on the lever portion 100 by means of a screw 106 extending through an aperture 108 in the finger and threaded into an aperture 110 in the lever portion. It should be noted that the aperture 110 is offset from the axis of rotation of the shaft 96 for a purpose described more fully hereinbelow. In addition, the aperture 110 is positioned so that the finger 104 may extend along and in substantial contact with the abutment portion 102, and the end 112 of the finger is rounded so as to permit the finger to pivot about the screw 106. Preferably, the screw 106 is provided with a bearing portion 114 to facilitate pivotal movement of the finger. As shown best in Fig. 3, the pivot member 98 is assembled within the mounting block by inserting the shaft 96 through the bore 94 and is retained in place by one or more snap rings 116 assembled within a groove 118 adjacent the free end of the shaft. As will appear from the description hereinbelow, the pivot member 98 is normally held so that the abutment portion and finger 104 extend generally parallel to the plane of rotation of the bending wheel 40. This is accomplished by means of a coil spring 120 connected between pins 122 and 124 secured to the mounting block 70 and the free end of the shaft 96, respectively.

Figure 7:
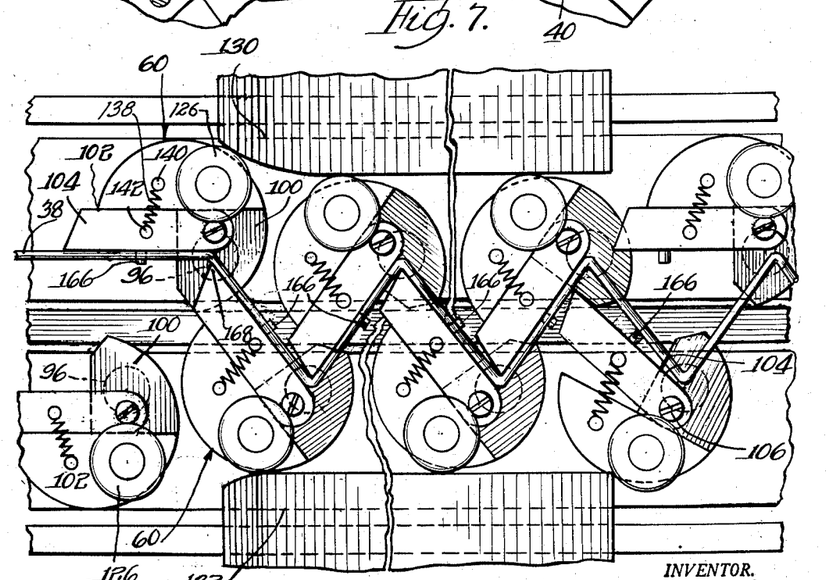
Fig. 7 is a development in plan taken along the arcuate line 7—7 in Fig. 6.
Figure 8:
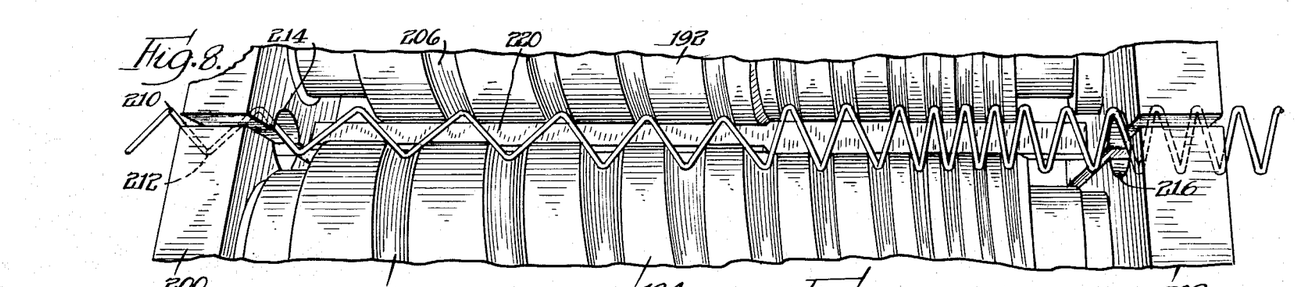
Fig. 8 is an enlarged fragmentary perspective view illustrating a novel portion of the apparatus of this invention utilized for increasing the sharpness of the undulations in the wire.

As shown best in Fig. 7, the bending devices 60 are arranged in two rows adjacent opposite sides of the wheel 40 with the bending devices in one row being staggered with respect to those in the other row. Means is provided for rotating the pivot members 98, and, thus, the fingers 104, inwardly so that the fingers in the two rows of bending devices alternately engage the wire 38 and bend it into a zigzag shape. This means includes a roller 126 mounted on the abutment portion 102 of each bending device by a pin 128. A pair of stationary cams 130 and 132 are positioned at opposite sides of the bending wheel 40 and may be conveniently mounted on the brackets 133 and 135 by means of bolts 134 and 136. As shown best in Fig. 7, the cams 130 and 132 project into the path of movement of the rollers 126 on the bending devices at opposite sides of the wheel so that as the bending devices move toward the right, the rollers engage the cams and are moved thereby so as to swing the pivot members 98 and the fingers thereon inwardly for bending the wire. The cams are preferably long enough so that the wire is securely clamped between several of the bending fingers before the fingers are returned to their normal positions to permit withdrawal of the wire. Furthermore, the cams are respectively provided with slots 137 and 139 through which the bolts 134 and 136 extend whereby the cams may be adjusted toward and away from each other in accordance with the relative adjustment of opposing bending devices 60 and the width of the zigzag wire to be formed. It is obvious that the relative positions of the various bending devices and the length of the fingers 104 may be adjusted so that the lengths of the transverse sections of the zigzag wire may be changed and the transverse sections may be disposed at various angles relative to each other. However, in order to facilitate further bending of the wire in the manner described below, the bending devices 60 are preferably constructed and arranged so that the angle between the transverse sections of the zigzag is less than 90°. Thus, when the roller 26 of a given bending device leaves its associated cam so that the spring 120 returns the device to its normal position, the bending finger 104 may be held by the zigzag wire so that it swings away from the abutment portion 102 of the pivot member in the manner illustrated by the lower righthand bending device shown in Fig. 7. However, as the pivot member 98 swings outwardly to its normal position, it is seen that the bending finger pivot or screw 106 moves outwardly, because it is offset from the shaft 96 so that the bending finger is withdrawn from the wire to permit the finger to swing back against the abutment portion 102. In order to swing the finger 104 back against the abutment member, a spring 138 is connected between pins 140 and 142 on the abutment portion and bending finger, respectively.

While the operation of the wire bending apparatus thus far described is believed to be clear, a short description of such operation is as follows. The bending wheel 40, which is rotatably supported between the brackets 44 and 46 mounted on a machine frame 144, is driven by means of a motor 146 through a conventional gear reducer 148. The gear reducer is operatively connected with the rotatable shaft 42 on which the bending wheel is mounted by suitable means, such as sprocket wheels 150, 152, 154, 155, and 156 and drive chains 158, 160, and 162. These sprocket wheels and drive chains may be of any conventional structure, and, therefore, need not be described in detail. The wire 38 is passed through adjustable tensioning rollers 163 and a suitable guide member 164 and inserted betweent the bending fingers 104. As shown in Figs. 1 and 2, the guide 164 is mounted for universal pivotal movement by means of a bifurcated bracket 165 pivotally connected to an adjustable slide 167 fixed on a post 169 and pin means 171 connecting the guide to the bracket. This structure prevents bending of the wire as the wire emerges from the guide. The fingers are provided with pins 166 adapted to underlie and support the wire and prevent it from falling between the bending devices. As the bending wheel is rotated, a wire is gripped between opposed bending fingers and drawn along with the wheel. Referring particularly to Fig. 7, it is seen that as the straight wire enters the left side of the apparatus, it is positioned against the first bending finger 104 in the upper row of bending devices and held thereagainst by the bending finger in the lower row of bending devices which has already been pivoted inwardly. As the wheel advances, the roller 126 of the upper left hand bending device engages the cam 130 so that the finger 104 is pivoted inwardly to bend the wire about the tip 168. It is seen that with this structure, the length of wire to be formed into each transverse section of the zigzag is in effect measured off by each finger 104, and the wire is bent substantially only at the corners of the zigzag without any stretching, whereby any possibility of stretching and weakening the transverse portions of the resulting zigzag wire due to the bending operation is reduced to a minimum. As set forth hereinabove, further rotation of the wheel causes the rollers 126 to disengage from the cams so that the bending fingers 104 open or return to their normal positions to allow the zigzag wire to be withdrawn from the wheel. While in accordance with the present invention it is contemplated that the zigzag or undulated wire formed by the bending wheel 40 be subjected to further operations, it should be understood that the zigzag wire in the form obtained from the bending wheel 40 might be used for articles such as non-sag springs.

Figure 23:
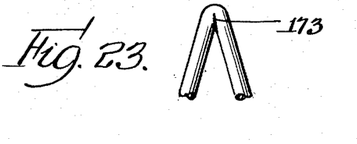
Fig. 23 is an enlarged fragmentary view of a zigzag wire formed in accordance with this invention.

However, in accordance with a feature of this invention it is contemplated that the zigzag wire will be formed into a tire insert in the manner described below. When the wire is used for this purpose it is desirable to weaken the curved portions of the zigzag wire so that they will break after the tire to which the insert has been applied has been driven a few miles. In order to obtain this result the curve portions of the wire are weakened or partially pre-fractured or ruptured as at 173 (see Fig. 23) during the bending operation. It has been found that by adjusting the rollers 163 so that a considerable amount of tension is applied to the wire, the curved portions will be partially pre-fractured or ruptured as indicated. On the other hand if the zigzag wire is to be used for non-sag springs the rollers 163 are adjusted so as to relieve the wire of any substantial tension whereupon the wire is formed without the partial ruptures 173.

Figure 5:
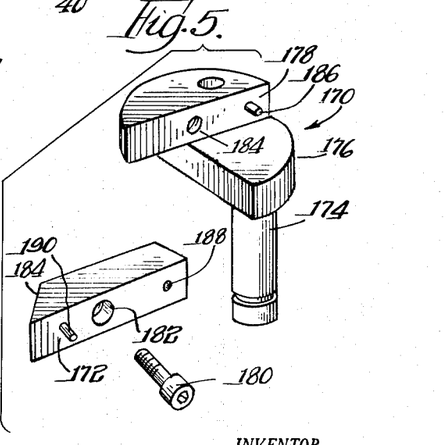
Fig. 5 is an exploded perspective view showing a modified form of the means illustrated in Fig. 4.

In Fig. 5, there is illustrated a pivot member 170 and a bending finger 172 which are similar to the above described pivot member 98 and bending finger 104, but embody a slightly modified form of this invention. The pivot member 170 includes a shaft 174, a lever portion 176, and an abutment portion 178, which correspond to the above described shaft 96, lever portion 100, and abutment portion 102. However, in this embodiment, the bending finger 172 is fixed on the pivot member by means of a screw 180 adapted to pass through an aperture 182 in the finger and be threaded into an aperture 184 in the abutment portion 178. In addition a pin 186 extends from the abutment portion for entry into aperture 188 in the finger. A pin 190 projects from the finger 172 for the same purpose as the above described pin 166. It is understood that in this embodiment the fingers 172 may be interchanged with each other as may the fingers of the embodiment shown in Fig. 4 to adapt the apparatus to form zigzag wires of different widths or in other words zigzag wires having transverse sections of different lengths.

In accordance with the present invention, the zigzag wire is directed from the bending wheel 40 to the mechanism 34 shown best in Figs. 1, 2, and 8 through 11, where the undulations or zigzags in the wire are compressed or made sharper. The mechanism 34 includes a pair of spaced parallel rollers 192 and 194 keyed on shafts 196 and 198, respectively. The opposite ends of the shaft 196 are journaled in end plates or brackets 200 and 202 supported on a base 204 fixed to the machine frame 144. The opposite ends of the shaft 198 are journaled in blocks 203 and 205 slidably mounted on the brackets 200 and 202 respectively. The block 203 is to be adjustably retained in position by bolts 207 and nuts 209 and the block 205 is similarly adjustably positioned by bolts 211 and nuts 213. With this structure it is seen that the roller 194 may be adjusted toward and away from the roller 192 in order to accommodate zigzag wires of different widths. As shown best in Figs. 8 and 9, the rollers 192 and 194 are provided with helical grooves 206 and 208 which are adapted to receive, respectively, corners 210 and 212 of the zigzag wire. It is understood, of course, that the end plate 200 is provided with an opening 214 through which the zigzag wire enters between the rollers and that the initial convolutions of the grooves 208 and 206 are arranged with respect to each other so as to receive the corners of the zigzag wire. In accordance with an important feature of this invention, subsequent convolutions of the helical grooves 206 and 208 are formed so that the undulations in the wire gripped therebetween are compressed as the wire advances between the rollers and finally through an outlet opening 216 in the end plate 202. Thus, the helical grooves 206 and 208 are formed so that the leads thereof decrease from their entering ends towards their discharge ends. Furthermore, as shown best in Fig. 9, the width of the grooves also progressively decreases, and thes depth of the grooves increases, toward the discharge end thereof. With this structure, it is seen that as the wire enters between the rollers, the corners or bends 210 and 212 thereof are held in the grooves 208 and 206, and as the wire advances, the forward movement of the corners is retarded relative to succeeding portions of the wire so that the undulations in the wire are compressed. Furthermore, since the width of the grooves also decreases, the corners or bends 210 and 212 are positively compressed between the sides of the grooves. This increases the sharpness thereof without any substantial bending of the relatively straight transverse sections of the zigzag wire. While, if desired, the grooves 206 and 208 may be formed so that the leads thereof uniformly change from one end to the other, it is generally preferable from the manufacturing standpoint to form the grooves in several sections with the convolutions in each section having substantially the same lead and shape. Thus, in the particular embodiment illustrated, the first three convolutions of the grooves adjacent the entering end of the compressing mechanism have substantially the same lead and shape. The next three convolutions have a reduced lead and a reduced width with an increase in depth; the next two convolutions have a smaller lead and width and greater depth; and the final three convolutions have a still smaller lead and width and a further increase in depth. Preferably, the bottoms of the final few convolutions are rounded in the same manner illustrated in order to form the bends in the wire as desired.

In order to prevent the wire from twisting between the compressing rollers, means is provided for maintaining the zigzag sections of the wire in a common plane. This means is shown best in Figs. 8 through 11 and includes a lower support member 218 extending between and for the entire length of the rollers. The support member 218 terminates in a guide surface 220 disposed adjacent a plane extending through the axes of the rollers 192 and 194 for supporting the wire substantially in this plane. A similar guide member 222 is supported above the member 218 and between the end plates 200 and 202. The guide member 222 terminates in a guide surface 224 spaced above the surface 220 a distance sufficient to allow the wire to pass freely therebetween without twisting.

Figure 9:
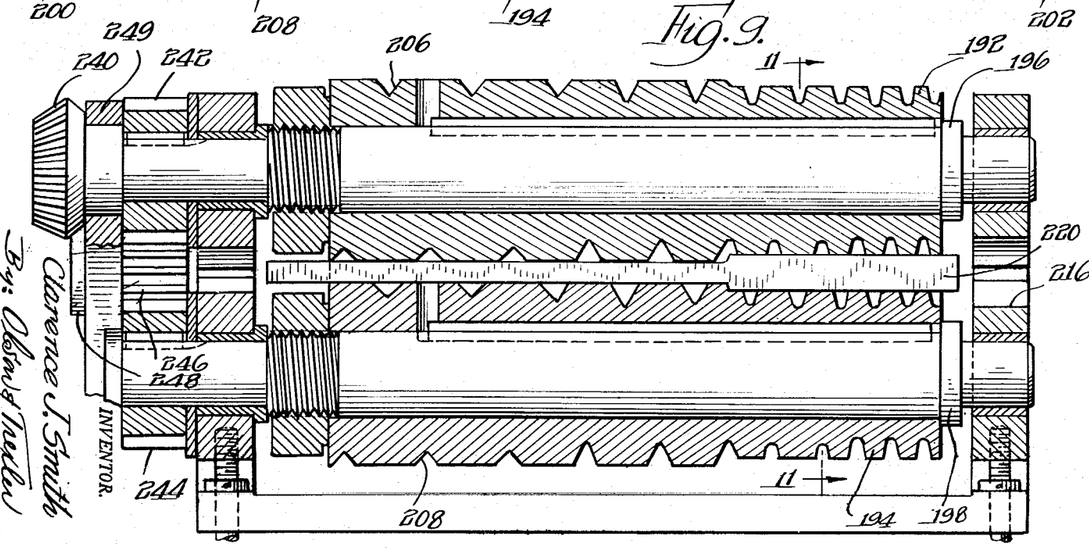
Fig. 9 is an enlarged horizontal cross sectional view taken along line 9—9 in Fig. 2.
Figure 10:
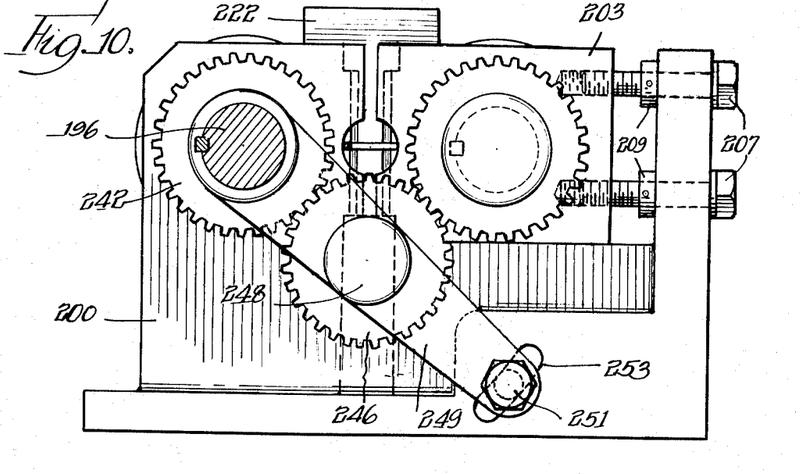
Fig. 10 is an enlarged elevational view taken along line 10—10 in Fig. 2.
Figure 11:
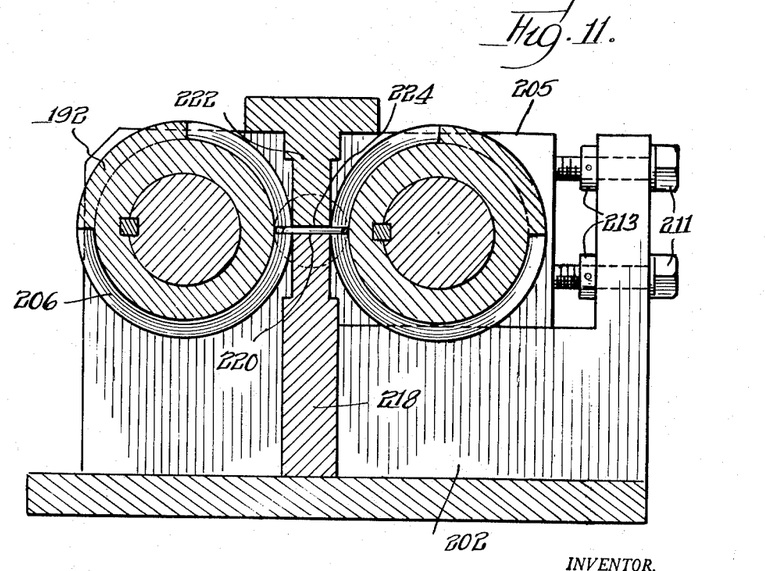
Fig. 11 is a vertical cross sectional view taken along line 11—11 in Fig. 9.

The rollers 192 and 194 are preferably driven from the variable speed drive 148. This may conveniently be accomplished by mounting a second sprocket wheel 226 on a shaft 228 to which the above described sprocket wheel 152 is secured and providing a drive chain 230 between the sprocket 226 and a sprocket wheel 232 fixed on one end of a shaft 234. The shaft 234 is journaled in suitable bearing means 236 supported on top of the machine frame 144, and a bevelled gear 238 is fixed on the end of the shaft 234 opposite the sprocket wheel 232. A relatively small bevelled gear 240 disposed for meshing engagement with the gear 238 is rigidly keyed or otherwise secured to an extension of the shaft 196 supporting the roller 192. In order to drive the roller 194, a spur gear 242 is also fixed to the shaft 196, and a similar spur gear 244 is fixed to an extension of the shaft 198 supporting the roller 194. An idler gear 246 is rotatably supported for operatively connecting the spur gears 242 and 244. The idler gear is adjustably supported to permit the rollers to be relatively adjusted toward and away from each other in the manner described above. Thus, the idler gear shaft 248 is secured to an arm 249 which has one end pivotally connected to the shaft 196 as shown in Figs. 9 and 10. The opposite end of the arm carries a bolt assembly 251 adapted to extend through a slot 253 in the bracket 200 to secure the arm in the desired adjusted position. In order to permit the rollers 192 and 194 to be operated continuously in combination with the above described wire bending wheel 40, the various sprocket wheels and gears of the above described drive means for the rollers and bending wheel are proportioned so that the lineal speed of the bending wheel is substantially equal to the rate of axial advancement of the first convolutions of the compressing rollers. This feature permits the wire to be undulated by the combined actions of the bending wheel 40 and the compressing rollers continuously and rapidly and in an economical manner.

Since the compressing rollers 192 and 194 may be operated at relatively high speed, it is obvious that considerable heat may be generated due to the frictional contact between the rollers and the wire. In order to avoid any damage to the wire or the rollers, it is desirable that a coolant and lubricant be applied to the rollers, and this may be accomplished in a simple manner by providing a container 250 around the rollers, as shown best in Figs. 1 and 2. The container is adapted to hold a body of liquid lubricant in which the lower portions of the rollers are immersed.

With the apparatus described thus far, it is seen that an undulated wire having relatively sharp zigzags may be formed efficiently and in an economical manner. This wire may be used for various articles, such as non-sag springs, or in accordance with another feature of this invention, the wire is directed to the above mentioned apparatus 36 where it is further formed to provide an article such as an automobile tire tread insert. Referring particularly to Figs. 12 through 17, it is seen that the apparatus 36 includes a punch press 252 of more or less conventional structure mounted on the machine frame 144 and a feeding device 254 for directing the zigzag wire into the punch press.

The punch press includes a bed 256 bolted or otherwise secured to the machine frame 144 and a die mounting block 258 secured to the bed. A pair of upstanding guides 260 and 262 are mounted on the bed 256 and are slidably received in guide sleeves 264 and 266, respectively, on the punch press ram 268. Since the mechanism for reciprocating the ram 268 may be of any conventional form, it is not illustrated or described in detail. However, such mechanism may conventionally be driven from the variable speed drive 148 through the above mentioned drive shaft 228, a sprocket wheel 270 fixed on the drive shaft, and a chain 272 between the sprocket wheel 270 and a second sprocket wheel 274. The sprocket wheel 274 is fixed on a shaft 276 rotatably mounted on the frame 144 and carrying a sprocket wheel or gear 278 which may be connected to the ram reciprocating mechanism by suitable means, not shown. The various elements of the ram drive means including the sprocket wheels 270, 274, and 278 are constructed so that the ram is operated in timed relationship with the above described bending wheel and compressing rollers, whereby the wire may be advanced through the machine at a continuous uniform rapid rate so as to promote efficient operation.

Figures 12, 13, 14:
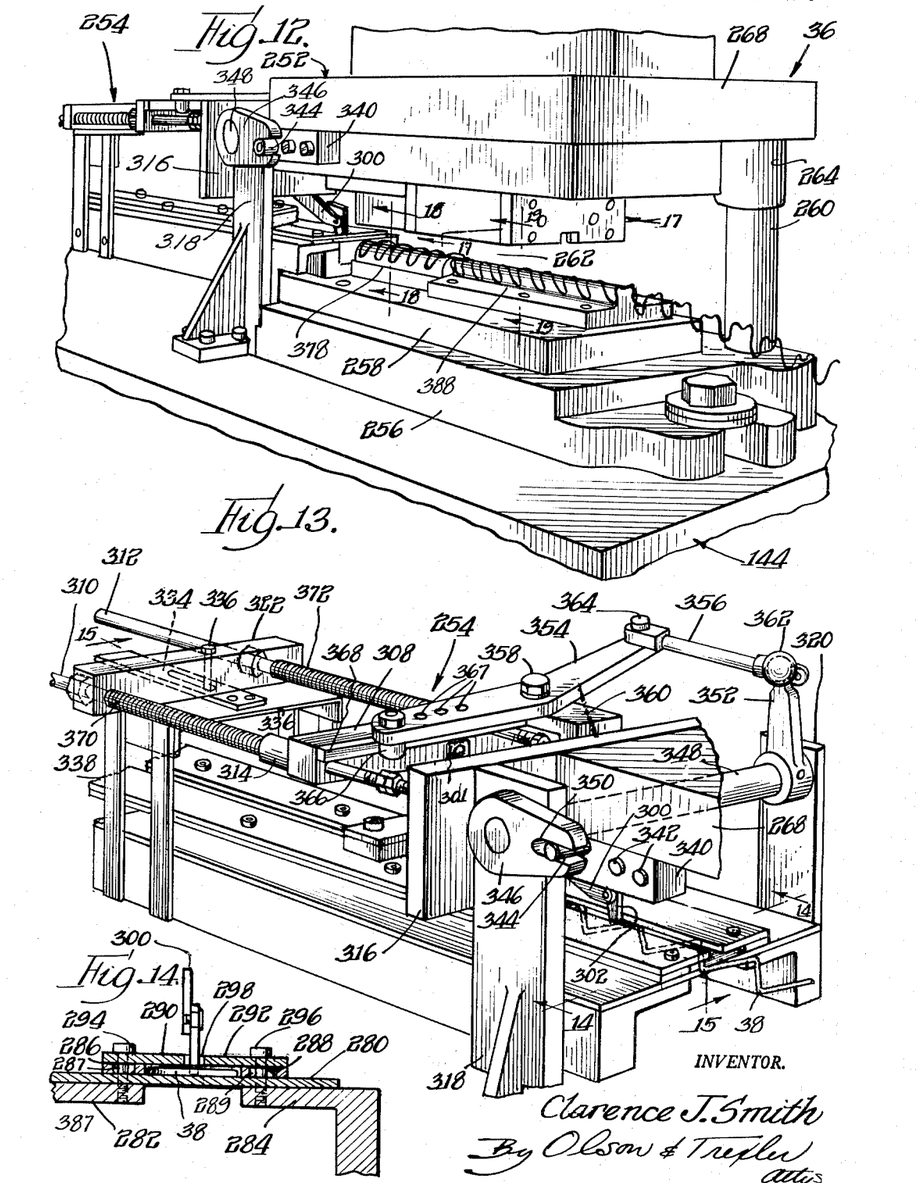
Fig. 12 is a perspective view of a portion of the apparatus of this invention used to form a zigzag wire into a tire tread insert.
Fig. 13 is a perspective view of a device for feeding the zigzag wire to the forming dies shown in Fig. 12.
Fig. 14 is a fragmentary cross sectional view taken along line 14—14 in Fig. 13.

Referring particularly to Figs. 12, 13, and 14, it is seen that the feeding mechanism 254 includes means for guiding the wire including a platform or table 280 supported on the machine frame 144 by a pair of angle irons 282 and 284 or any other suitable means. A pair of longitudinally extending guide members 286 and 288 are disposed on the platform and spaced apart wide enough to receive the zigzag wire therebetween. Elongated plates 290 and 292 are disposed upon the guide members 286 and 288, respectively, for retaining the wire between the guide members. The guide members and elongated plates may conveniently be secured to the platform by means of a plurality of screws 294 and 296, and the guide members are provided with transverse elongated slots 287 and 289 for receiving the screws so that the guide members may be adjusted to accommodate zigzag wires of different widths. It should be noted that the inner margins of the elongated plates 290 and 292 are spaced apart to provide a slot 298 into which a feeding bar 300 extends for engaging and feeding the wire. A leaf spring 301 anchored at 303 is provided for urging the bar downwardly. Means described below is provided for reciprocating the feeding bar, and, preferably, the bar is provided with a pivotally mounted dog 302 at its lower end for engaging the wire during the forward stroke and which dog is adapted to slide over the wire during the reverse stroke. The dog is retained by an overload spring 305 so that it may pivot rearwardly in the event the wire becomes jammed in the dies to prevent injury to the apparatus.

In order to feed the wire properly, it is necessary that the feeding bar 300 be operated in time with the reciprocating ram 268, and thus the feed bar is pivotally mounted, as at 304, by means of a bifurcated bracket 306 to a carriage member 308 which is actuated in time with the reciprocating ram. The carriage member 308 extends between and is slidably supported on a pair of parallel rods 310 and 312 for reciprocating movement. Preferably, the carriage member 308 is mounted on the rods by means of bearing sleeves 314 to reduce excess frictional wear. The forward ends of the rods are connected in any suitable manner to a cross member 316 welded or otherwise secured to upstanding posts 318 and 320. The opposite ends of the rods extend through bores in a cross bar 322, which cross bar is adjustably connected to a slotted arm 334 by a nut and bolt assembly 336. The arm 334 is in turn connected to a cross piece 336 of an inverted U-shaped support 338.

In order to reciprocate the carriage bar 308, and thus the feeding bar 300, in time with the ram 268, the carriage bar is actuated by a mechanism mechanically connected with the ram. Thus, as shown best in Figs. 12 and 13, a mounting block 340 is secured to the ram by means of screws 342 and carries a roller 344. A lever 346 fixed on a shaft 348 rotatably journaled in the upstanding posts 318 and 320 is provided with a slot 350 for receiving the roller 344. With this structure, it is seen that as the ram 268 is reciprocated, the lever 346 and the shaft 348 will be oscillated in time therewith. A second lever 352 is keyed or otherwise fixed on the shaft 348 for movement therewith and is connected with a bell crank 354 by a connecting rod 356. The bell crank is pivotally mounted, as at 358, to an arm 360 which in turn is welded or otherwise secured to the cross plate 316. Thus, the bell crank is oscillated about the pivot point 358 in time with the movement of the ram, and in order to permit this oscillating movement, a connecting rod 356 is pivotally connected to the lever 352 by suitable ball joint 362 and one end of the bell crank by suitable pin means 364. The opposite end of the bell crank is disposed adjacent the carriage bar 308 and is provided with a roller 366 adapted to move along a flange or track portion 368 on the carriage bar. With this structure, it is seen that as the ram 268 moves downwardly, the bell crank 354 will be pivoted in a clockwise direction, as viewed in Fig. 13, so that the carriage bar 308 and the feeding bar 300 are moved rearwardly. In order to advance the carriage bar and the feeding bar to feed the zigzag wire, coil springs 370 and 372 are mounted on the rods 310 and 312, respectively, and disposed between the cross bar 322 and the carriage bar. Thus, as the ram move upwardly, the bell crank 354 is pivoted in a counterclockwise direction, and the springs force the carriage bar 308 forwardly so as to maintain contact with the roller 366. The length of the feeding bar stroke may be adjusted to accommodate zigzag wires having different spacing between the transverse portions thereof by mounting the roller 366 in one of several holes 367 provided in the bell crank 354.

Figure 15:
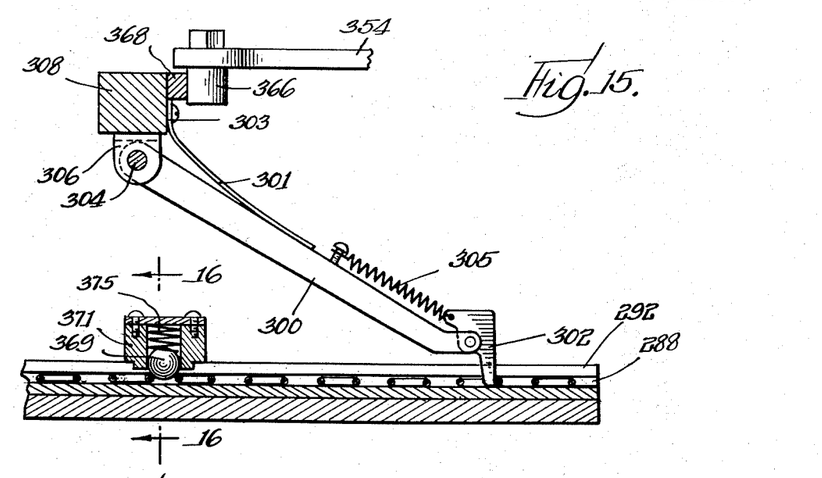
Fig. 15 is a cross sectional view taken along line 15—15 in Fig. 13.
Figure 16:
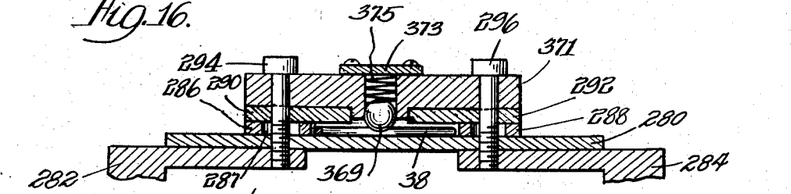
Fig. 16 is a cross sectional view taken along line 16—16 in Fig. 15.

In order to retain the zigzag wire in proper position with respect to the dies during the back stroke of the feeding bar, a ball detent 369 is mounted between the guide plates 286 and 288 as shown best in Figs. 15 and 16. The ball is retained within a housing member 371 which may be held in place by the screws 294 and 296. A cover plate 373 is fixed to the housing and a spring 375 is disposed between the ball and the cover plate for resiliently urging the ball between the transverse portions of the zigzag wires.

Figures 20, 21:
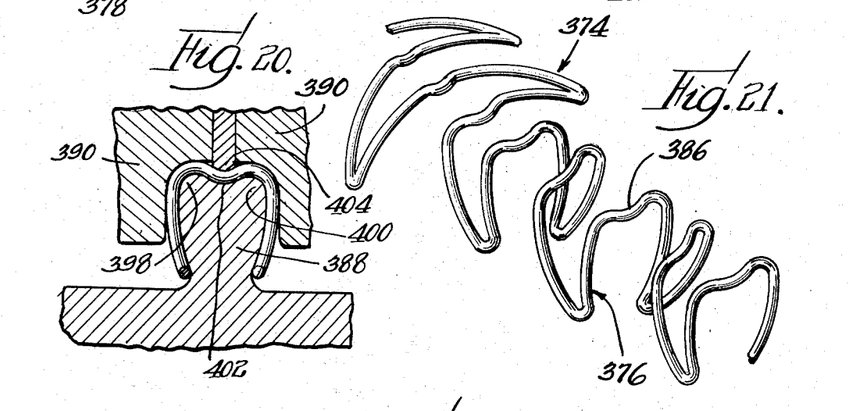

In accordance with a feature of this invention, the zigzag wire is formed in the manner shown in Figs. 12, 18, 19, 20 and 21 to provide a final product useful as an automobile tire tread insert. As shown in Fig. 21, the zigzag wire is preferably formed in two stages indicated at 374 and 376 so that the transverse sections of the wire in the final stage are generally U-shaped with inturned ends. In order to form the wire as at the stage 374, a die 378 is fixed on the die block 258 in any suitable manner, and a complementary upper die 380 is secured to the ram. It should be noted that the dies 378 and 380 are formed so that the transverse sections of the zigzag wire are bent into a relatively shallow dish-shape so as to prevent undue stretching and weakening of the wire. Furthermore, in the embodiment illustrated, the lower die 378 is provided with a longitudinally extending centrally located recess 382, and the upper die is provided with a complementary projection 384, whereby to indent the transverse sections of the zigzag wire, as at 386. As is understood by those familiar with the art, these indentations in the tire tread insert help to prevent the wire from turning out of the tire tread after the tread has been worn.

After the wire has been formed by the dies 378 and 380, it is advanced by the above described feeding means to a second set of dies including the lower die 388 and upper die 390 mounted on the die block 258 and the ram, respectively. As shown best in Figs. 19 and 20, the surface of the lower die 388 conforms to the final shape of the wire article, or, more particularly, the surface of the die 388 is generally U-shaped with lower portions thereof recessed to permit the ends of the transverse wire sections to be turned inwardly. However, the surface 392 of the upper die 390 is formed so that the side walls thereof are substantially vertical and parallel to each other. Thus, as the die 390 moves downwardly, it engages the wire, as at 394 and 396, and bends the wire around the corners 398 and 400 of the lower die 388. It is seen that as the upper die 390 advances to its lower position shown in Fig. 17, there will be substantially no further bending of the wire, but since the transverse sections of the wire have already been curved or bent by the dies 378 and 380, the end portions of the transverse wire sections move into conformity with the inwardly tapering side surfaces of the lower die 388. Preferably, the die 388 is recessed, as at 402, and the upper die 390 is provided with projection means 404 to prevent the indentations 386 in the wire from being drawn out. With this structure, it is seen that the final desired shape of the tread insert wire may be obtained with relatively simple and economical dies and without requiring complicated die portions for bending the ends of the transverse U-shaped wire sections inwardly.

Figure 17:
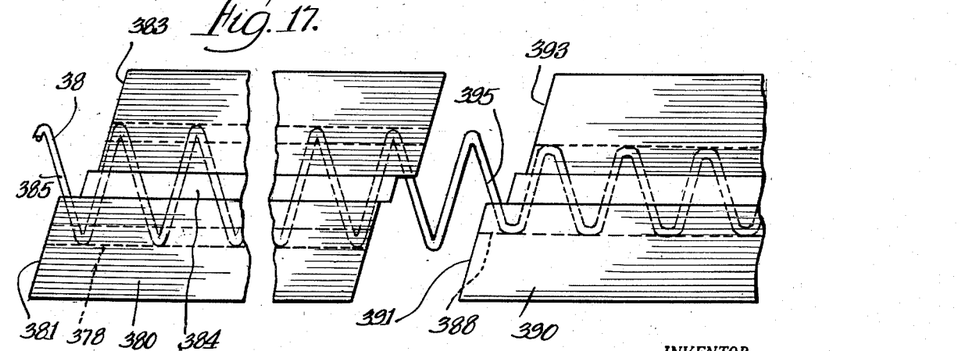
Fig. 17 is a fragmentary cross sectional view taken along line 17—17 in Fig. 12.
Figure 18:
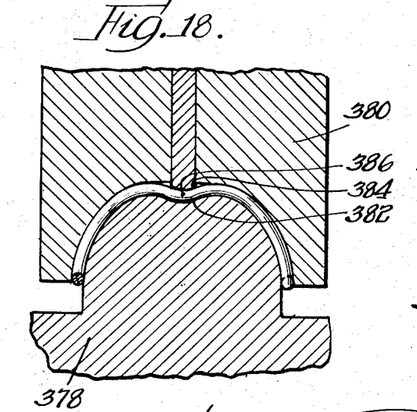
Fig. 18 is a fragmentary cross sectional view taken along line 18—18 in Fig. 12, but showing the upper and lower dies moved together in wire bending relationship.
Figure 19:
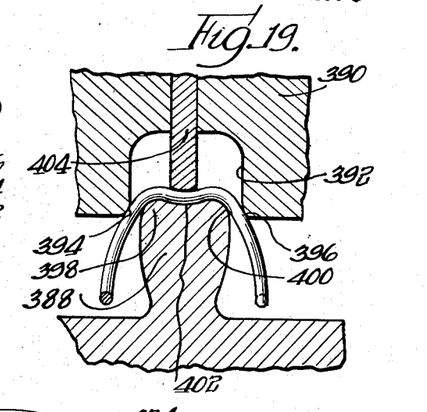
Fig. 19 is a fragmentary enlarged cross sectional view taken along line 19—19 in Fig. 12.

In order to prevent injury to the wire as it enters the first dies 378 and 380 and again as it enters the second set of dies 388 and 390, the dies are formed so that one-half of a zigzag portion of the wire disposed at the entering ends of the dies is formed. This structure is illustrated in Fig. 17 wherein the dies are respectively shown to have bevelled entering ends 381 and 391. If desired, the entering ends may be stepped as at 383 and 393. The angle of the bevelled die ends preferably approximates the angle between the transverse wire portions so as to strike the transverse portions 385 and 395 at about the mid portion thereof while permitting some deviation from the exact proper positioning of the wire. This feature is important since it has been found that dies having conventional squared ends often injure the wire or otherwise fail to perform satisfactorily.

Figure 24:
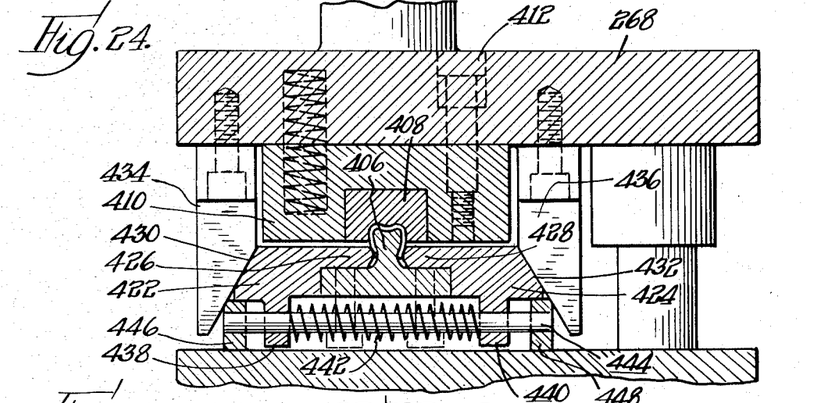
Figures 25, 26:
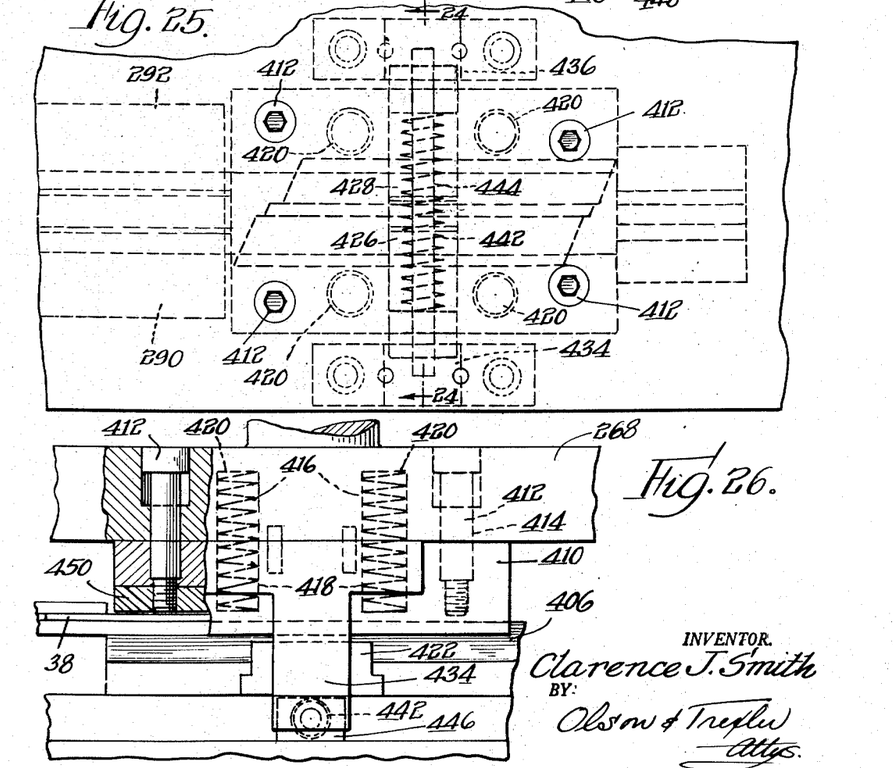
Fig. 25 is a plan view of the portion of the apparatus shown in Fig. 24.
Fig. 26 is a fragmentary elevational view, partially broken away, of the apparatus shown in Fig. 25, or when looking toward the left hand side of Fig. 24.

In Figs. 24, 25 and 26, there is shown a slightly modified embodiment of the present invention, whereby the zigzag wire may be formed into the desired shape for a tire insert with only a single stroke of the ram. In order to accomplish this, a lower die 406, which is substantially identical to the above described die 388, is provided, and an upper die 408 generally similar to the above described upper die 390 is arranged to cooperate with the die 406. The dies 406 and 408 are also provided with bevelled entering edges in the same manner as the dies described above. The die 408 is mounted in a holding block 410 which is connected to the ram 268 by means of a plurality of bolts 412. As shown in Figs. 24 and 26, the bolts 412 are threaded into the die holding block 410 and slidably extend through bores 414 in the ram. The enlarged heads of the bolts are also slidably disposed in countersunk portions of the bores so that engagement of the heads with the bottoms of the countersunk portions limits downward movement of the die holding block 410 relative to the ram. The ram is also provided with a plurality of bores 416, each of which is aligned with a complementary bore 418 in the die holding block. A compression spring 420 is disposed in each set of complementary bores 416 and 418 in the manner illustrated for yieldably biasing the die holding block 410 downwardly away from the ram. Thus, as the ram moves downwardly during a wire forming stroke, the die 408, which is initially spaced from the ram by the springs, engages the wire and forms it around the die 406, whereupon the springs 420 are compressed and the ram moved downwardly into contact with the block 410, positively to press the die 408 against the die 406 in the manner illustrated in Figs. 20 and 22.

Since in this embodiment, the above described forming dies 378 and 380 have been omitted, it is necessary to provide means for forming the ends of the zigzag wire transverse sections inwardly to conform with the inwardly tapering sides of the lower die 406. This means includes a pair of slides 422 and 424 disposed on opposite sides of and mounted for movement transversely of the lower die 406. These slides are, respectively, provided with fingers 426 and 428 adapted to engage the ends of the transverse wire sections and form them inwardly against the lower die 406 when the slides are moved toward each other. In order to move the slides together to form the ends of the wire inwardly, the ends of the slides are formed to provide inclined cam surfaces 430 and 432 which are, respectively, engaged by complementary cam members 434 and 436 fixed to the ram. Since, as set forth above, the upper die is initially positioned below the ram by the springs 420, it is seen that the wire will be initially formed by the upper die before cam members fixed on the ram have been lowered sufficiently to engage and actuate the slides toward each other. In order to spread the slides apart, they are, respectively, provided with depending ears 438 and 440, and a compression spring 442 is disposed between these ears. Preferably, the spring is retained in position by means of a guide rod 444 fixed at its opposite ends in upstanding members 446 and 448 and slidably extends through apertures in the ears 438 and 440.

The embodiment shown in Figs. 24 and 25 has the advantage of the die structure illustrated in Figs. 12, 15, and 16 in that the wire may be formed upon only one stroke of the ram. However, the structure of Figs. 24 and 25 is relatively complicated as compared with the simple dies of the above described preferred embodiment. Furthermore, since the transverse sections of the zigzag wire are sharply bent by the die 408, as compared to the initial relatively shallow bending operation performed by the above described die 380, the tempered wire may have a tendency to twist when engaged by the die 408. This slight disadvantage may, however, be overcome by securing a flat holding plate 450 to the die holding block 410, which holding plate engages the wire immediately adjacent the die 408 and prevents the wire from twisting.

Figure 22:
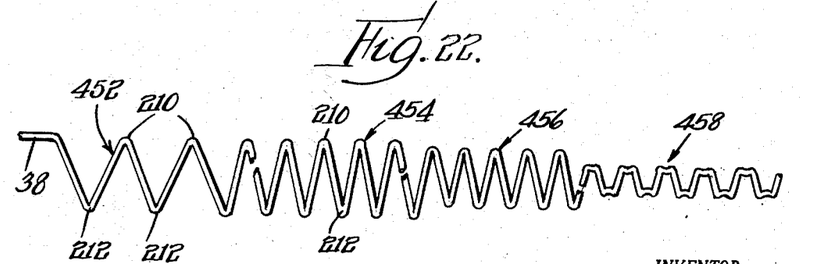
Fig. 22 is a plan view of a length of wire and illustrating the steps of forming the wire in accordance with the present invention.

In Fig. 22, there is illustrated a length of the wire 38 which shows how the wire is formed in accordance with the preferred method of the present invention. Thus, the wire is continuously drawn into the bending wheel 40, wherein a section 452 thereof is formed with the bends 210 and 212 by the fingers 104 so that the transverse portions of the wire are substantially straight and unstretched and are disposed at a relatively large angle with respect to each other. From the bending wheel, the wire is advanced continuously to the compressing rolls 192 and 194 so that the bends 210 and 212 are gripped in the grooves of the rolls and compressed or more sharply bent therein to provide a wire section 454 with transverse portions disposed at a relatively small angle with respect to each other. The substantially flat and sharply undulated wire section 454 is then fed to the forming dies, and in the preferred embodiment, the transverse wire portions and the bends 210 and 212 are curved transversely of the plane of the zigzag wire to provide a wire section 456 having a transverse cross section of the shape shown in Fig. 15 and illustrated by the wire portion 374 in Fig. 21. The section 456 is then directed to the final forming dies where spaced and intermediate areas of the transverse wire portions are rather sharply bent to provide a section 458, wherein the transverse wire portions are generally U-shaped with inturned ends as shown in Fig. 20 and by the wire portion 376 in Fig. 21. It is understood, of course, that in the event the die structure shown in Figs. 20 through 22 is used, the method just described for forming the wire will be the same, except that the step of forming the slightly bent section 456 is eliminated. Furthermore, it is understood that the wire in the zigzag form of either section 452 or 454 may be used for other purposes than that of forming a tire insert. For example, these zigzag sections might be used to form springs of the non-zag type.

From the above description, it is seen that the present invention has provided a novel method and apparatus, whereby a wire may continuously and economically be formed into a zigzag shape without stretching or unduly weakening the wire. Furthermore, it is seen that the present invention has provided a novel method and apparatus, whereby a zigzag wire may be continuously and rapidly compressed to increase the sharpness therein and further continuously and economically formed to provide an article such as a tire tread insert. It is also seen that in general, the novel apparatus of the present invention is relatively simple and economical, and, therefore, savings in operation and maintenance costs may be effected.

While the preferred embodiments of the present invention have been shown and described herein, it is obvious that many structural details may be changed without departing from the spirit and scope of the appended claims.

The invention is claimed as follows:

1. In an apparatus for making wire articles from wire stock moving along a path of travel, the combination comprising a plurality of wire bending members disposed on opposite sides of said path of travel, means supporting said members for movement along a portion of said path of travel means mounting said members on said supporting means for pivotal movement with respect to said supporting means into said path of travel portion and for movement relative to said supporting means and transversely of and toward and away from said path of travel portion, and means for actuating said members on opposite sides of the path of travel portion alternately so that the members are pivoted into said path of travel portion to form the wire into a zigzag shape and then laterally withdrawn and pivoted from said path of travel portion to disengage from the wire.

2. In an apparatus for undulating a wire moving along a path of travel, the combination comprising a pair of wire bending members disposed to receive a wire therebetween, means supporting said members for movement along a portion of said path of travel means pivotally mounting said members on said supporting means for movement relative to said supporting means and toward and away from the wire to undulate the wire, and means pivotally connecting said members to said mounting means for movement about axes offset from the axes of pivotal movement of the supporting means, whereby said bending members may be swung about the axes of pivotal movement of the supporting means into engagement with the wire, and upon reverse pivotal movement of the supporting means the members may be pivoted about said connecting means and withdrawn laterally from the wire to permit the formation of relatively deep undulations in the wire.

3. In an apparatus for making a wire article, the combination comprising a rotatable support means, a plurality of wire bending members arranged around the periphery of said rotatable means and disposed in a plurality of rows so as to receive a wire between the rows, means mounting said bending members on said support means and for pivotal movement about axes extending transversely of the axis of rotation of said rotatable member, and means connecting said bending members with said mounting means for movement of said members and said axes of pivotal movement laterally of the wire, whereby to permit the formation of relatively deep undulations in the wire.

4. In an apparatus for making an undulated wire, the combination comprising rotatable support means, a plurality of wire bending members spaced around said support means and arranged in a plurality of rows adapted to receive a wire therebetween, means for mounting each of said bending members on said support means for pivotal movement about axes extending generally radially of said support means, and means pivotally connecting said bending members to said mounting means for pivotal movement about axes offset from said first mentioned axes, whereby the bending members may move laterally away from a wire therebetween after bending of the wire so as to permit the formation of relatively deep undulations in the wire.

5. The combination defined in claim 4, which includes fixed cam means adjacent said rows of bending members, and means associated with each of said bending members and engageable with said cam means for pivoting the bending members about the axes of the mounting means to form undulations in the wire.

6. A combination, as defined in claim 4, wherein each of said bending members includes an elongated finger adapted to engage a predetermined length of wire and substantially simultaneously fold the entire predetermined length of wire, whereby to form the wire into zigzag shape having substantially unstretched transverse portions joined by curved portions.

7. An apparatus for making a wire article from wire stock, moving along a path of travel, comprising means adjacent said path of travel for applying tension to the wire stock, and means adjacent said path of travel for bending the tensioned stock into a zigzag shape having angularly disposed transverse portions joined by curved portions, said bending means including a support member movable along a portion of said path of travel, a pair of bending members disposed for receiving the wire therebetween, means shiftably mounting said members on said support means for movement relative to the support means toward and away from the wire, and means pivotally connecting said members to said mounting means for movement relative to the mounting means for facilitating formation of deep undulations in the wire, said tension applying means being adapted to tension the wire sufficiently to cause a partial fracture of said curved portions.

References Cited in the file of this patent

UNITED STATES PATENTS

| | | |
|---|---|---|
| Re. 21,263 | Kaden | Nov. 13, 1939 |
| 653,505 | Edwards | July 10, 1900 |
| 1,285,996 | Hensley | Nov. 26, 1918 |
| 1,808,019 | Clausing | June 2, 1931 |
| 2,002,399 | Kaden | May 21, 1935 |
| 2,148,914 | Terhaar | Feb. 28, 1939 |
| 2,153,936 | Owens | Apr. 11, 1939 |
| 2,305,266 | Lincoln | Dec. 15, 1942 |
| 2,378,058 | Blumensaadt | June 12, 1945 |
| 2,538,644 | Guess | Jan. 16, 1951 |
| 2,549,061 | Dauenhauer | Apr. 17, 1951 |
| 2,600,506 | Kimes | June 17, 1952 |
| 2,737,212 | Huszar | Mar. 6, 1956 |
| 2,747,619 | Buttner | May 29, 1956 |

FOREIGN PATENTS

| | | |
|---|---|---|
| 317,753 | Germany | Dec. 29, 1919 |
| 106,894 | Australia | Mar. 23, 1939 |